(12) United States Patent
Tillman

(10) Patent No.: US 7,801,773 B2
(45) Date of Patent: Sep. 21, 2010

(54) METHOD, SYSTEM, AND COMPUTER READABLE STORAGE MEDIUM FOR CONDUCTING AN ONLINE SHOPPING SESSION BETWEEN A CUSTOMER AND ONE OR MORE VENDORS THROUGH A CENTRAL HOST

(76) Inventor: Michael Tillman, 4522 Willowview Ct., Howell, MI (US) 48843

( * ) Notice: Subject to any disclaimer, the term of this patent is extended or adjusted under 35 U.S.C. 154(b) by 631 days.

(21) Appl. No.: 11/823,573

(22) Filed: Jun. 28, 2007

(65) Prior Publication Data

US 2007/0255629 A1 Nov. 1, 2007

Related U.S. Application Data

(63) Continuation of application No. 10/386,886, filed on Mar. 12, 2003, now abandoned.

(60) Provisional application No. 60/363,437, filed on Mar. 12, 2002.

(51) Int. Cl.
G06Q 30/00 (2006.01)
G06F 17/30 (2006.01)
(52) U.S. Cl. .......................... 705/26; 705/27
(58) Field of Classification Search .............. 705/26–27
See application file for complete search history.

(56) References Cited

U.S. PATENT DOCUMENTS

| | | |
|---|---|---|
| 5,970,469 A | 10/1999 | Scroggie et al. |
| 6,347,304 B1 | 2/2002 | Taricani, Jr. |
| 6,405,176 B1 * | 6/2002 | Toohey .................. 705/26 |
| 6,460,072 B1 | 10/2002 | Arnold et al. |
| 6,473,740 B2 | 10/2002 | Cockrill et al. |
| 6,629,135 B1 | 9/2003 | Ross, Jr. et al. |

(Continued)

FOREIGN PATENT DOCUMENTS

WO WO0031657 6/2000

OTHER PUBLICATIONS

"GlOSS.COM Ready for Relaunch". Cassandra Chiacchio. WWD. New York: Oct. 19, 2001. p. 12 [recovered from Proquest Database].*

(Continued)

Primary Examiner—William J. Allen
(74) Attorney, Agent, or Firm—MacMillan, Sobanski & Todd, LLC

(57) ABSTRACT

One or more networked computers (18) receives input from a customer (12) specifying two or more vendors having vendor web sites (14) from which to purchase goods or services during an online shopping session, receives input from the two or more vendors indicating that the customer has purchased goods or services at the two or more vendor web sites during the online shopping session, and outputs a single online receipt (32) to the customer reflecting all goods or services purchased at the two or more vendor web sites during the online shopping session. Sales tax may be collected from the customer for goods or services purchased during the online shopping session and electronically disbursed tax to one or more tax authorities. Payment for the goods or services purchased during the online shopping session may be electronically collected and disbursed to vendors. Credits for one or more purchased goods or services may also be disbursed. Reports may be generated based on a plurality of data collected during POS transactions.

10 Claims, 16 Drawing Sheets

U.S. PATENT DOCUMENTS

| | | | |
|---|---|---|---|
| 6,643,624 B2 | 11/2003 | Philippe et al. | |
| 7,107,226 B1* | 9/2006 | Cassidy et al. | 705/26 |
| 7,197,475 B1* | 3/2007 | Lorenzen et al. | 705/26 |
| 2001/0029470 A1* | 10/2001 | Schultz et al. | 705/26 |
| 2008/0294538 A1* | 11/2008 | Barsade et al. | 705/31 |

OTHER PUBLICATIONS

Office Action Non-Final Rejection dated Oct. 5, 2004, related to U.S. Appl. No. 10/386,886.
Amendment dated Jan. 10, 2005, related to U.S. Appl. No. 10/386,886.
Office Action Final dated Mar. 11, 2005, related to U.S. Appl. No. 10/386,886.
Amendment After Final dated May 23, 2005, related to U.S. Appl. No. 10/386,886.
RCE/Amendment dated Jul. 5, 2005, related to U.S. Appl. No. 10/386,886.
Office Action Non-Final Rejection dated Sep. 21, 2005, related to U.S. Appl. No. 10/386,886.
Amendment dated Dec. 14, 2005, related to U.S. Appl. No. 10/386,886.
Office Action Non-Final Rejection dated Mar. 24, 2006, related to U.S. Appl. No. 10/386,886.
Amendment date Jun. 15, 2006, related to U.S. Appl. No. 10/386,886.
Office Action Final Rejection dated Jul. 7, 2006, related to U.S. Appl. No. 10/386,886.
Appeal Brief dated Aug. 28, 2006, related to U.S. Appl. No. 10/386,886.
Appeal Brief dated Nov. 7, 2006, related to U.S. Appl. No. 10/386,886.
Examiner's Answer dated Nov. 17, 2006, related to U.S. Appl. No. 10/386,886.
Reply Brief dated Jan. 19, 2007, related to U.S. Appl. No. 10/386,886.
Examiner's Answer dated Jan. 23, 2007, related to U.S. Appl. No. 10/386,886.
BPAI Decision dated May 7, 2008, related to U.S. Appl. No. 10/386,886.
Advisory Action dated Jun. 15, 2005, related to U.S. Appl. No. 10/386,886.

* cited by examiner

METHOD, SYSTEM, AND COMPUTER READABLE STORAGE MEDIUM FOR CONDUCTING AN ONLINE SHOPPING SESSION BETWEEN A CUSTOMER AND ONE OR MORE VENDORS THROUGH A CENTRAL HOST

CROSS REFERENCE TO RELATED APPLICATIONS

This application is a continuation of U.S. application Ser. No. 10/386,886, filed Mar. 12, 2003 now abandoned, and further claims priority to U.S. provisional application Ser. No. 60/363,437, filed Mar. 12, 2002.

STATEMENT REGARDING FEDERALLY SPONSORED RESEARCH

Not Applicable.

BACKGROUND OF THE INVENTION

The present invention relates generally to electronic commerce, and more specifically to a novel method and system for hosting centralized online point-of-sale ("POS") activities for a plurality of distributed customers and vendors.

FIG. 1 schematically illustrates the operation and architecture of conventional Internet commerce. Via the Internet 10, a plurality of online customers 12a-12e access or otherwise browse a plurality of vendor web sites 14a-14d. Notably, online customers 12a-12e may access or otherwise browse distributed vendor sites utilizing a variety of devices/utilities having operable electronic or wireless connectivity to the Internet 10. Devices/utilities include but are not limited to a personal computer 12a, Microsoft X-Box 12b, a personal data assistant 12c, conventional telephone 12d, or wireless telephone 12e. Alternately, customers using phones 12d and 12e can contact vendor sites directly, as represented by arrows 7 and 9 respectively.

The operation and architecture of conventional Internet commerce suffers from at least three general drawbacks. First, customers who wish to purchase goods or services from multiple vendor sites during an online shopping session must make multiple purchase transactions. For example, a customer who purchases three goods from three different vendors has to input his or her shipping address, billing address, credit card number, e-mail address, etc. three separate times. Besides simply being frustrating and time consuming, this redundant data entry is prone to errors.

Another general drawback associated with the operation and architecture of conventional Internet commerce is the fact that each purchase transaction results in a separate vendor receipt 16a-16d that the customer must account for and maintain. Due to varying post-transaction practices at the vendor sites, the receipts are e-mailed back to the customer at varying times after the actual time of purchase, only complicating customer accounting and maintenance. This multi-receipt problem also increases the chances that one of the several receipts will be lost—by the customer, the vendor, or otherwise.

Yet another general drawback associated with the operation and architecture of conventional Internet commerce is the lack of centralized tax collection and disbursement. Today, each tax-collecting vendor must independently collect taxes from each of its customers, and disburse those taxes to the appropriate tax collection agencies. Each vendor site may be required to collect and disburse these revenues to all 50 States plus other national and international jurisdiction, resulting in costs for added employees and equipment.

Because each Internet vendor is currently responsible for independently hosting their respective point-of-sale activities (e.g. customer account maintenance, payment processing, receipts, returns, tax collection/disbursement, etc.) an inherent inefficiency exists. Despite the welcome diversity among the broad spectrum of specialized products and services that each individual vendor offers, they must each redundantly staff, host, execute and support the same basic point of sale activities.

What is needed is a method and system for hosting centralized online point of sale activities for a plurality of distributed customers and vendors.

SUMMARY OF THE INVENTION

Preferred embodiments of the present invention illustrated and described herein include an online method and system for hosting centralized point of sale activities for a plurality of distributed customers and vendors. More specifically, these and other embodiments of the present invention include a novel and efficient means for providing customers with a single receipt for an online sales session, independent of the number of different online vendors from which goods or services are purchased. The invention is an Internet E-Commerce purchasing/sales control and sales tax collection vehicle (i.e., software system) that is "inserted" between the end customer and the Point-of-Sale (POS) software systems of each vendor.

In addition, embodiments of the present invention facilitate central sales tax collection and disbursement, eliminating the need for the distributed vendor sites to provide costly and timely investments in redundant taxation services that are not related to the quality of the goods or services that vendors offer. Put another way, online vendors utilizing features of the present invention do not have to make the time and capital investment necessary to host tax collection and disbursement activities, many of which are or will soon be required by law.

Another advantageous feature of the present invention allows a customer to input payment information only once during an online shopping session, independent of the number of different online vendors from which goods or services are purchased. This feature simply reduces the redundancy, time and aggravation many customers experience during their online shopping sessions.

Another advantageous feature of the present invention supports the processing of customer returns and processing in a centralized fashion similar to the centralized sale processing aspects of the present invention.

Preferred embodiments of the present invention include a method and system for centrally hosting online point of sale activities. A system comprising one or more networked computers is operably programmed and configured to receive input from a customer specifying two or more vendors having vendor web sites from which to purchase goods or services during an online shopping session, receive input from the two or more vendors indicating that the customer has purchased goods or services at the two or more vendor web sites during the online shopping session, and output a single online receipt to the customer reflecting all goods or services purchased at the two or more vendor web sites during the online shopping session. The one or more networked computers may additionally be programmed and configured to collect sales tax from the customer for goods or services purchased during the online shopping session and electronically disburse the collected sales tax to one or more tax authorities (either immediately or on a periodic basis). The one or more networked computers may additionally be programmed and configured to collect and electronically disburse payment for the goods or services purchased during the online shopping session. Payment may be electronically disbursed to the two or more vendor web sites (either immediately or on a periodic basis). Payment may be electronically disbursed to vendor banking institutions (or maintained in a bank account of the hosting entity), and may be subject to a transactional fee for hosting the point-of-sale activities.

The one or more networked computers may additionally be programmed and configured to disburse a credit for one or more purchased goods or services. The one or more networked computers may additionally be programmed and configured to electronically obtain payment authorization from the customer's credit card company for goods or services to be purchased at the two or more vendor sites.

The one or more networked computers may additionally be programmed and configured to present the customer with an online table of contents including a plurality of hyperlinks to different vendor web sites.

In one aspect of the invention, a method is provided for conducting an online shopping session between an end customer and a vendor through a central host. The end customer contacts the central host to initiate an online shopping session, and then they invoke at the central host an address of a vendor site. The central host enters an idle state for passing through communications between the end customer and the vendor site as the end customer makes purchase selections on the vendor site. The central host sets a trigger in response to a payment information screen being sent to the end customer by the vendor site. The central host intercepts payment information of the end customer in response to the trigger. Then the central host queries the end customer whether the online shopping session is completed. If yes, the central host sends an enumerated receipt including all purchase selections from the online shopping session and then closing the online shopping session. If no, the central host holds the purchase selections already made and returns to steps (b)-(g) invoking another address for another vendor site.

DETAILED DESCRIPTION OF THE PREFERRED EMBODIMENTS

Figure 1:
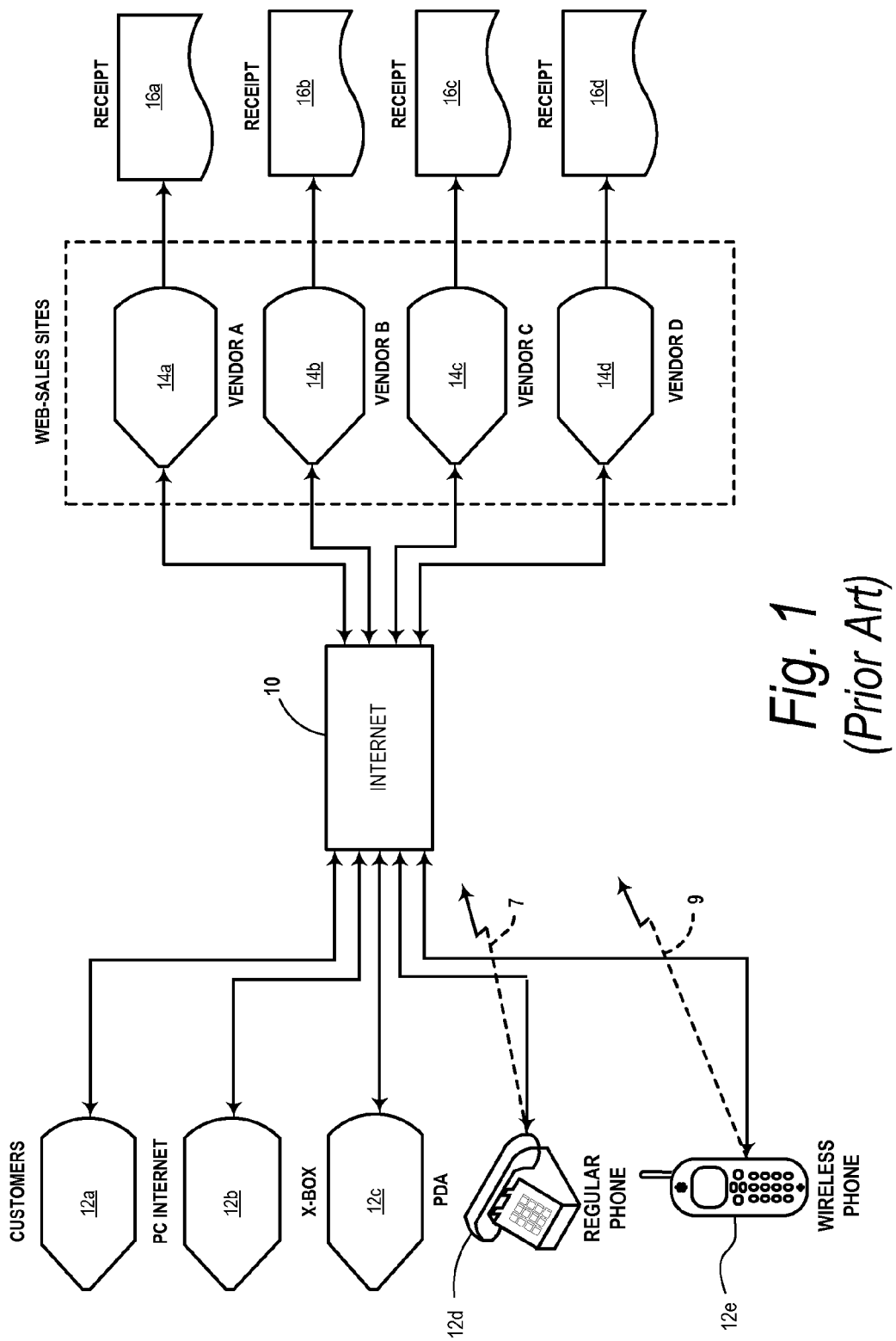
FIG. 1 schematically illustrates the operation and architecture of conventional Internet commerce.
Figure 2:
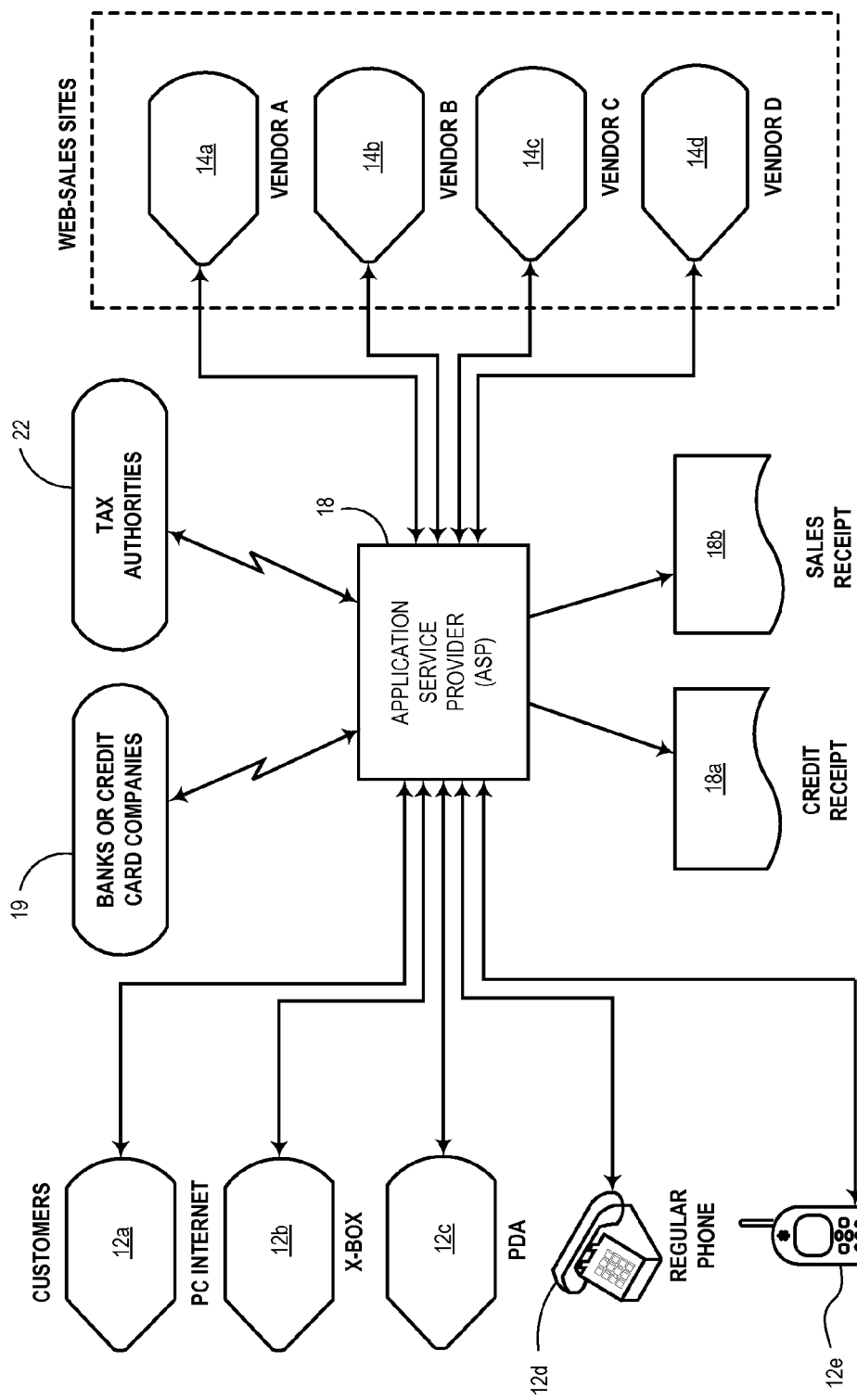
FIG. 2 schematically illustrates an overview of a preferred implementation of the present invention.

Embodiments of the present invention include a method and system for hosting centralized online point of sale activities for a plurality of distributed customers and vendors. FIG. 2 schematically illustrates a preferred implementation of the present invention. Those in the art will recognize, however, that the content or arrangement of all figures illustrating aspects of the present invention may be modified or supplemented within the scope of the present invention to best-fit a particular implementation scenario.

In accordance with the preferred implementation illustrated in FIG. 2, application service provider ("ASP") 18 centrally hosts a variety of online point-of-sale ("POS") activities between a plurality of customers 12a-12e and a plurality of vendor web sites 14a-14d. Notably, vendors 14 may include conventional online vendors of goods and services as well as online auction web sites (e.g. E-Bay, Yahoo, Amazon, etc.).

Online POS activities hosted by ASP 18 include but are not limited to (i) payment processing for goods and/or services rendered to customers 12a-12e, (ii) tax collection and disbursement between customers 12a-12e and tax authorities 22, respectively, (iii) issuance of receipts 18a, 18b to customers 12a-12e, (iv) issuance of payment to vendors 14a-14d or credit card companies 19 for goods and/or services sold, and (v) processing of customer returns and refund/credit processing.

Notably, ASP 18 centralizes online POS activities between customers 12, credit card companies 19, and tax collecting authorities 22 such that a customer purchasing multiple goods or services from multiple vendor sites 14a-14d during an online shopping session undergoes a single online payment/taxation transaction and receives a single consolidated online sales/credit receipt 18a-18b therefor, independent of the number of purchases or vendors involved.

In a preferred embodiment; ASP 18 includes one or more networked server computers in operable communication with web browsers operating on customer client computers 12a-12e, and vendor server computers hosting vendor sites 14a-14d. Additionally, ASP 18 server computers may be in operable communication with payment institutions 19 (e.g., banks, credit card companies, etc.) and tax authorities 22. ASP 18 server computers include software systems to act as a controlling agent for the point-of-sale activities and to "pass through" an end customer to venders' sales sites.

Figure 3:
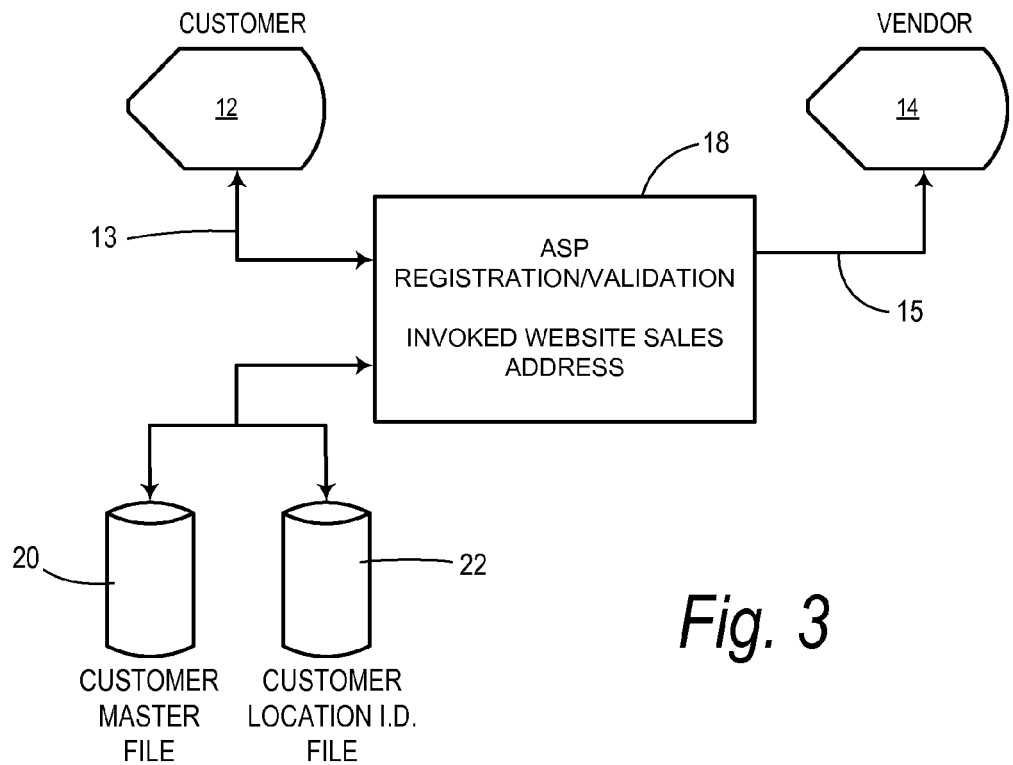
FIG. 3 schematically illustrates how a customer accesses the ASP to begin an online shopping session in accordance with a preferred implementation of the present invention.

FIG. 3 schematically illustrates how customer 12 accesses to ASP 18 to begin an online shopping session in accordance with a preferred implementation of the present invention. More specifically, customers 12 are validated or registered upon login, as represented by arrow 13. Customer master file database 20 maintains customer demographic information. Customer location I.D. database 22 maintains tax jurisdiction/authority information for each customer. Upon customer validation, ASP 18 enables customer access to vendor sites 14, as represented by arrow 15.

Figure 4:
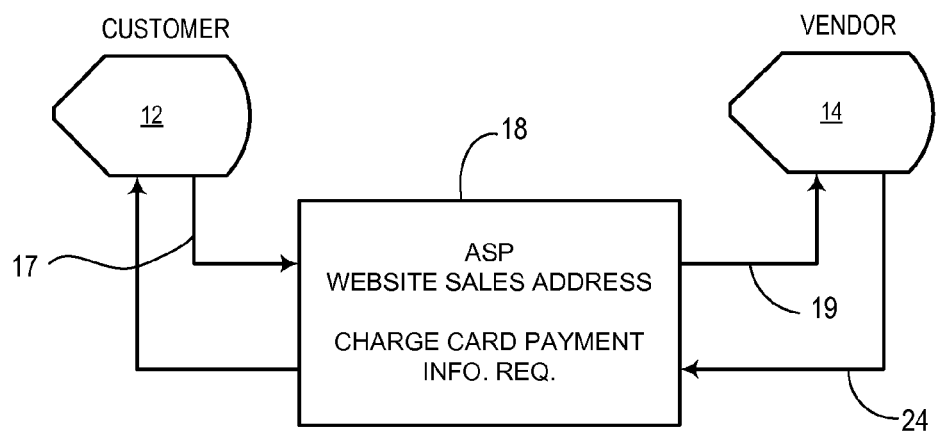
FIGS. 4 through 7 are block diagrams which schematically illustrate a detailed manner in which POS activities associated with an online shopping session may be hosted at ASP in accordance with preferred implementations of the present invention.

FIGS. 4 through 7 schematically illustrate the manner in which POS activities associated with an online shopping session may be hosted at ASP 18 in accordance with preferred implementations of the present invention. Referring now to FIG. 4, a customer obtains or otherwise selects a vendor site via ASP 18, as represented by arrow 17. Next, the customer browses to the selected online vendor site 14, as represented by arrow 19. Upon selecting one or more items for purchase from the vendor 14, the vendor submits a payment request to customer 12 via ASP 18, as represented by arrow 24. This activity alerts ASP 18 that customer payment information (e.g. credit card information) will be forthcoming, enabling ASP 18 to intercept the payment information as it passes from the customer 12 to the vendor 14 in response to the vendor's request.

Figure 5:
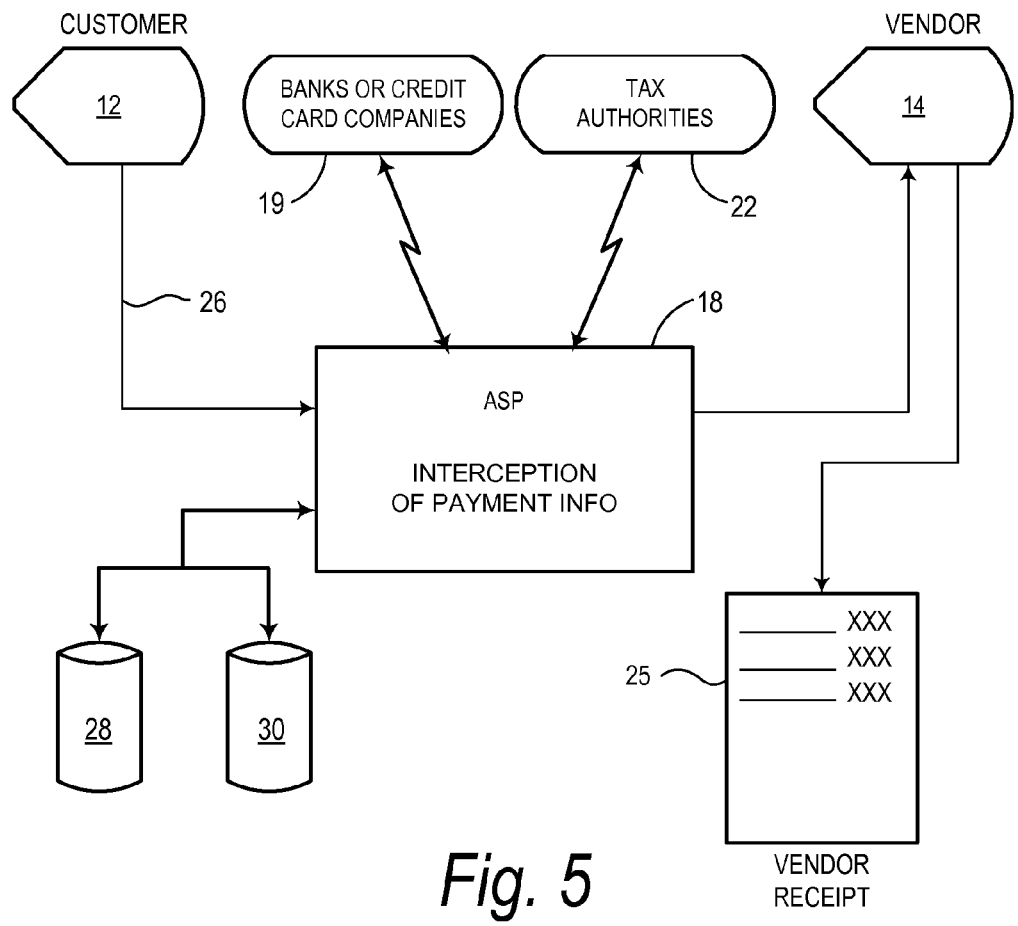

FIG. 5 illustrates an interception at ASP 18 of the customers payment information, represented by arrow 26. Upon interception, two preferred scenarios are provided. In scenario "A", vendor 14 is notified that the ASP 18 has intercepted the customer's 12 payment information 26. According to this scenario, ASP 18 awaits a purchase receipt 25 from vendor 14. When the receipt 25 is obtained, ASP 18 adds an appropriate sales tax and transactional fee, and executes the payment and taxation transaction with the appropriate authorities 19 and 22, respectively. In other words, ASP 18 collects payment information from the customer 12 and automatically/electronically disburses payment to the appropriate vendor(s) and tax authorities.

In scenario "B", ASP 18 forwards the payment information through to the vendor 14 for vendor-managed purchase approval and disbursement. ASP 18 awaits a purchase receipt 25 from vendor 14. When the receipt 25 is obtained, ASP 18 adds a transactional fee and the appropriate sales tax (i.e. by jurisdiction), and executes a payment transaction on these amounts only. In this scenario, however, only the tax authority and the ASP itself are thereafter credited (the vendor has already executed a customer payment transaction for goods sold).

Preferably, transactional charges and sales tax are added on a per-line-item basis. Next, the ASP 18 writes all line items and corresponding tax and transaction charges to a sales transaction file 28 and sales tax file 30 for the customer's current online shopping session. Notably, receipt 25 is not forwarded to customer 12 at this time.

Figure 6:
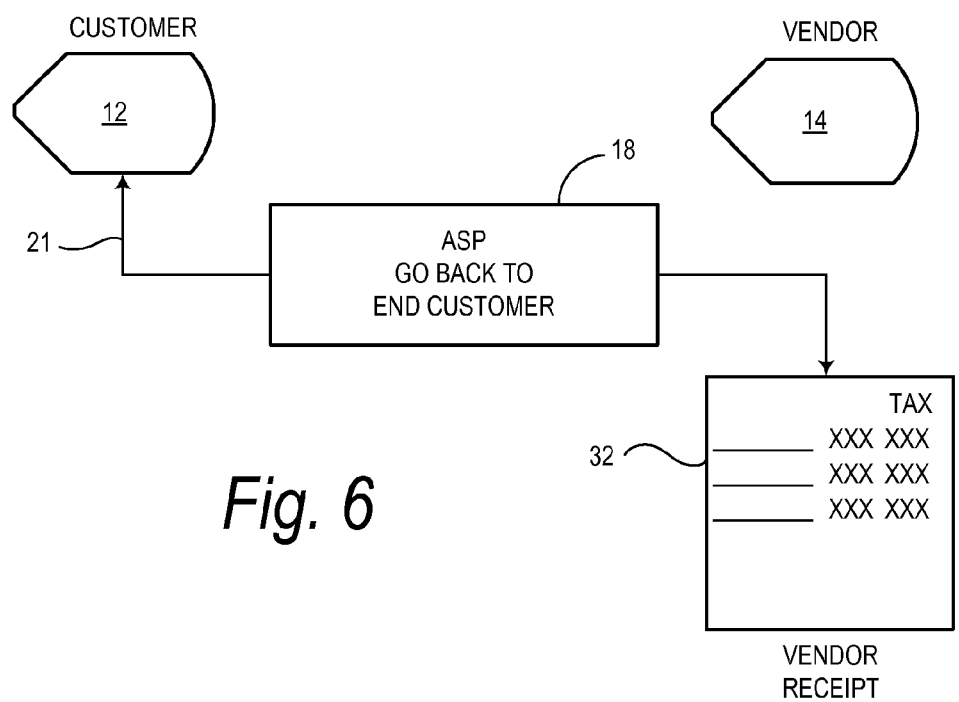

FIG. 6 schematically illustrates certain POS activities following the completion of the customer's first purchase transaction (see FIGS. 4 and 5). Upon completion of the first transaction, ASP 18 sends a message to or otherwise communicates with customer 12 to inquire whether customer 12 is finished shopping, as represented by arrow 21. If the customer is not finished shopping, the processes illustrated and described with respect to FIGS. 4 and 5 are generally repeated. For subsequent purchases, ASP 18 automatically consolidates the original vendor receipt 25 and any subsequent vendor receipts into a consolidated receipt 32 in a fashion that is transparent to the customer. However, a "current total" or "current receipt" may be displayed to the customer throughout the current online shopping session.

Preferably, customer payment information is maintained at ASP 18 throughout the online shopping session such that a customer need only submit his or her payment information once.

If customer 12 indicates that he or she is finished shopping, the consolidated receipt 32 is forwarded to the customer and the current online shopping session is terminated. Preferably, the consolidated receipt includes all line item sales from all vendors along with the corresponding taxes and transactional charge(s).

Notably, web-based POS sales activities such as those illustrated and described above may be configured and implemented to support cross-jurisdictional (e.g. inter-state, multinational, etc.) collection and disbursement of payment for goods purchased and corresponding sales taxes (e.g., United States sales taxes, Canadian value added taxes (VAT), etc.).

Figure 7:
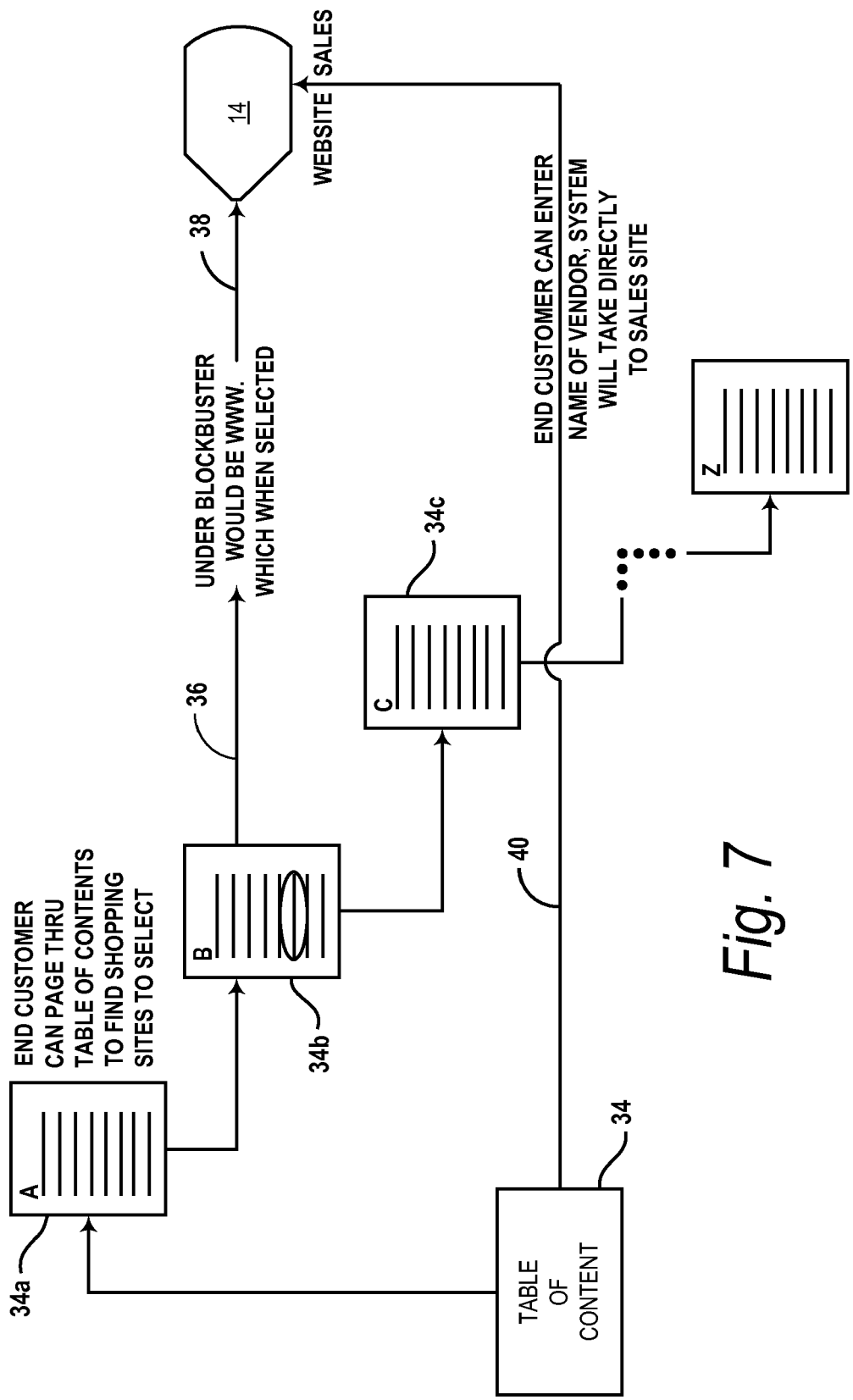

FIG. 7 schematically illustrates customer navigation through ASP 18 (e.g. FIGS. 2 and 4) to a vendor 14 in accordance with a preferred embodiment of the present invention. Preferably, ASP 18 (not shown) provides a registered customer (not shown) with an online table of contents 34 containing hyperlinks to a plurality of online vendors 14. In one embodiment of the present invention, the customer browses the online table of contents (e.g. 34a, 34b, 34c) and selects a particular vendor of interest, as represented by arrow 36. Selection of the vendor of interest, as represented by arrow 38, directs the customer's browser to vendor website 14, as represented by arrow 38. In an alternate embodiment, the customer inputs his or her own URL directing the customer's browser to a particular vendor site, as represented by arrow 40.

Another aspect of the present invention supports customer return/refund processing. According to one embodiment of the present invention customer return/refund processing is managed via ASP 18 in a fashion similar to sale processing discussed and illustrated with respect to FIGS. 2 through 7. More specifically, payment information is ultimately intercepted at ASP 18 and forwarded to payment institutions 19 and/or tax institutions 22 for issuance of a credit to customer 12. A final vendor receipt 25 reflecting the return/refund is issued to ASP 18 and customer 12 detailing the line items being returned along with the proper credit amounts for the actual purchase and for the various sales taxes levied enumerated on it. If a return/refund is being requested from multiple vendors 14, a consolidated receipt 25 reflecting the return/refund is generated and forwarded to the customer 12.

Another aspect of the present invention supports report generation. According to one embodiment of the present invention, ASP 18 is programmed and configured to collect and store a plurality of information as customer and vendor POS activities such as those described herein are transacted. Preferably, certain data collected is associated with a country, state/province, county, township/borough, and city. This aspect of the present invention enables queries and corresponding reports to target geographical criteria at various levels of granularity. Of course, multiple levels of granularity may be implemented across a wide variety of other collected data including age group, market, etc. This aspect of the present invention additionally enables relative comparisons and analyses (e.g. trend analyses, point-in-time analyses, etc.).

Table 1 below includes a variety of example reports generated by ASP 18. Of course, other reports may be generated within the scope of the present invention.

TABLE 1

| Report Category | Report Description |
|---|---|
| Total or Individual Sales Analysis | Item-description and/or item inventory number Vendor |
| | Sales tax jurisdiction-country, state/province, county, township! borough, city |
| | Sales class-description and/or class number/designation |
| | Sales/vendor location |
| | End customer |
| | Time period-day, week, month, quarter, year, day-to-day, week-to-week, month-to-month, quarter-to-quarter, year-to-year |
| | Payment methods-charge card company breakdown by usage, geographical location, income median, zip code, age group etc. |
| | Auction sales locations. |
| | Purchase orders issued for item return/credits |
| Pseudo Inventory Reports | Inventory turnover by vendor. |
| | Inventory turnover by sales location. |
| | Inventory turnover by/for the end customer. |
| | Inventory turnover by sales location. Inventory turnover by geographical location. |
| | Inventory to sales "turnover" ratio by vendor sales location(s). |
| | Inventory to sales "turnover" ratio by vendor inventory location. |
| | Inventory to sales "turnover" ratio by vendor production location. |
| | Inventory values-LIFO or FIFO |
| | Inventory values at 3rd party sales locations or auction locations. |

TABLE 1-continued

| Report Category | Report Description |
|---|---|
| Return Sales Items Reports | Inventory returned by purchase order issued Item return/defect analysis Total returns/credits by sales item. Total returns/credits by vendor. Total returns/credits by sales tax jurisdiction-country, state/province, county, township/borough, city. Total returns/credits by sales/vendor location Total returns/credits by end customer Total returns/credits by payment method (i.e. by charge card company and/or bank) Total returns/credits by time period-day, week, month, quarter, year, day-to-day, week-to-week, month-to-month, quarter-to-quarter, year-to-year. Total purchase orders issued for returns |
| Returned Sales Items Reports (with Auction Locations) | Returned sales by 3$^{rd}$ party sales vendor/auction location. Returned sales/auction items by item-description. Returned sales/auction items by sales tax jurisdiction-country, state/province, county, township/borough, city. Returned sales/auction items by end customer. Returned sales/auction items by time period-day, week, month, quarter, year, day-to-day, week-to-week, month-to-month, quarter-to-quarter, year-to-year. Value of returned sales to 3rd party auction locations by price. |
| Sales Tax Collected Reports | Sales taxes collected by sales tax jurisdiction such as country, state/province, county, township/borough, city. Sales taxes paid by sales tax jurisdiction such as country, state/province, county, township/borough, city. Sales taxes collected by time period-day, week, month, quarter, year, day-to-day, week-to-week, month-to-month, quarter-to-quarter, year-to-year. Sales taxes paid by time period-day, week, month, quarter, year, day-to-day, week-to-week, monthto-month, quarter-to-quarter, year-to-year. Sales taxes collected by end customer. Sales taxes collected by vendor. Sales taxes collected by item sales class. Sales taxes collected by vendor/sales location. Sales taxes collected by customer. Sales taxes collected by geographical location. |
| Revenue Reports | Total revenue by vendor/customer Total revenue by end customer. Total revenue by geographical location. Total revenue by sales class of items. Total revenue by payment method-charge card companies. Total revenue by vendor class. Total revenue by ₃rd party auction locations. Total revenue by sales item. Total revenue by vendor/customer sales location. |
| Auction Location Reports | Auction location sales-by sales item/vendor/sales class/geographical location, payment method, etc. Auction location sales by sales item inventory value. Auction location sales by inventory resale turnover and turnover ratio. |
| Information Resale Reports | Data analysis by race/gender. Data analysis by income group. Data analysis by age group-1, 2, 3, 4 (these are the traditional age group numeric designations in a variety of areas such as voter registration etc.) Data analysis by geographic location. Data analysis by single, married, married with children etc. Data analysis by payment method-charge card type. Data analysis by occupation (usually coded by an occupation code). |
| | Data analysis by country phone code, telephone area code/exchange. Data analysis by sales vendor/item/sales class designations. |
| Sales Taxes Paid Reports | Sales taxes paid by bank deposit into the respective bank accounts by vendor, by geographical location, by sales item, by location code etc. Sales taxes paid by taxing jurisdiction-country, state/province, county, township/borough, city. Sales taxes paid by vendor/customer. Sales taxes paid by sales item. Sales taxes paid by bank account wire transfer and/or deposited into. Also, sales taxes paid by check printing run. Sales taxes paid by vendor/customer sales locations. Sales taxes collected/paid by reconciliation information. Sales taxes paid by end customer. Sales taxes paid by time period-day, week, month, quarter, year, day-to-day, week-to-week, monthto-month, quarter-to-quarter, year-to-year. Sales taxes paid by auction location. Sales taxes paid/credited (for returned sales) reconciliation reports. |
| Misc. Reports | Leasing fee reports by vendor/customer sales locations. Transaction fee reports by end customer/customer/payment method/dales items! sales item class/geographical location etc. Total revenue report by end customer. Total revenue report by customer. Total revenue report by customer sales location. Total revenue report by sales item(s). Total sales report by customer. Total sales report by end customer. Total sales report by geographical location. Total sales/revenue reports by sales tax jurisdiction/auction locations/item sales class/credits-returned items etc. Net sales tax money due and readily available for investment. Sales tax anticipation payment schedules by sales tax jurisdiction/customer/customer sales locations/auction locations etc. Managed float report on all foundation commerce corporation short term investments using net sales tax due money balances. |

A further embodiment of the invention based on a software system referred to as VIDECT is described in connection with FIGS. 8-18.

Figure 8:
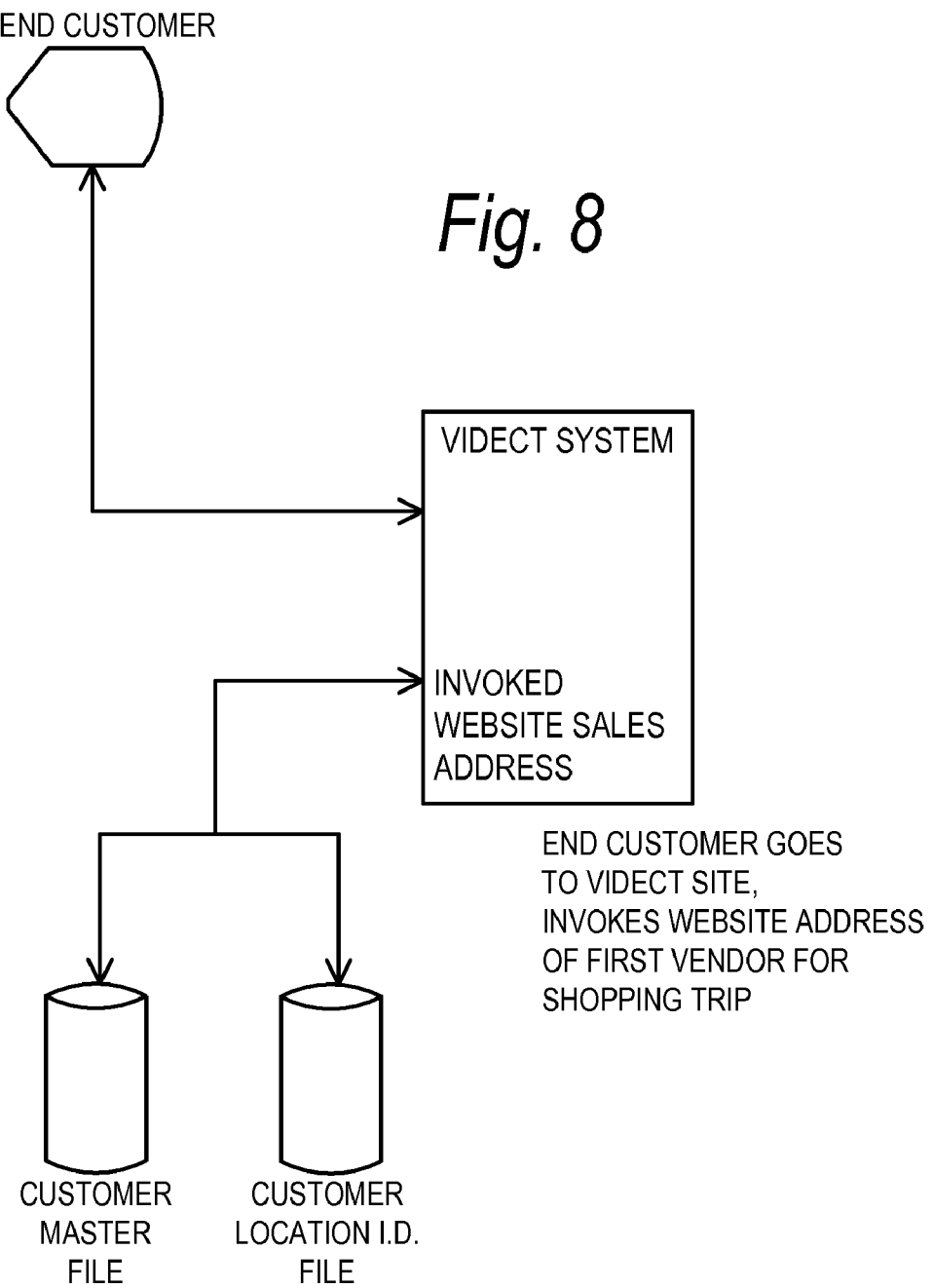
FIGS. 8 through 18 are block diagrams which schematically illustrate a further embodiment of the invention based on a preferred software system.

FIG. 8 illustrates how the end customer accesses the VIDECT system and selects the website sales address of the vendor that begins the shopping trip. Once accessed through the customer master file and/or through the customer location I.D. file, the VIDECT software systems have all the location I.D.s, and all other information required to construct the daily E-Commerce sales/returns transaction records and the daily sales tax records. At this point, the VIDECT software systems are in a "wait state" until the first shopping trip is completed.

Figure 9:
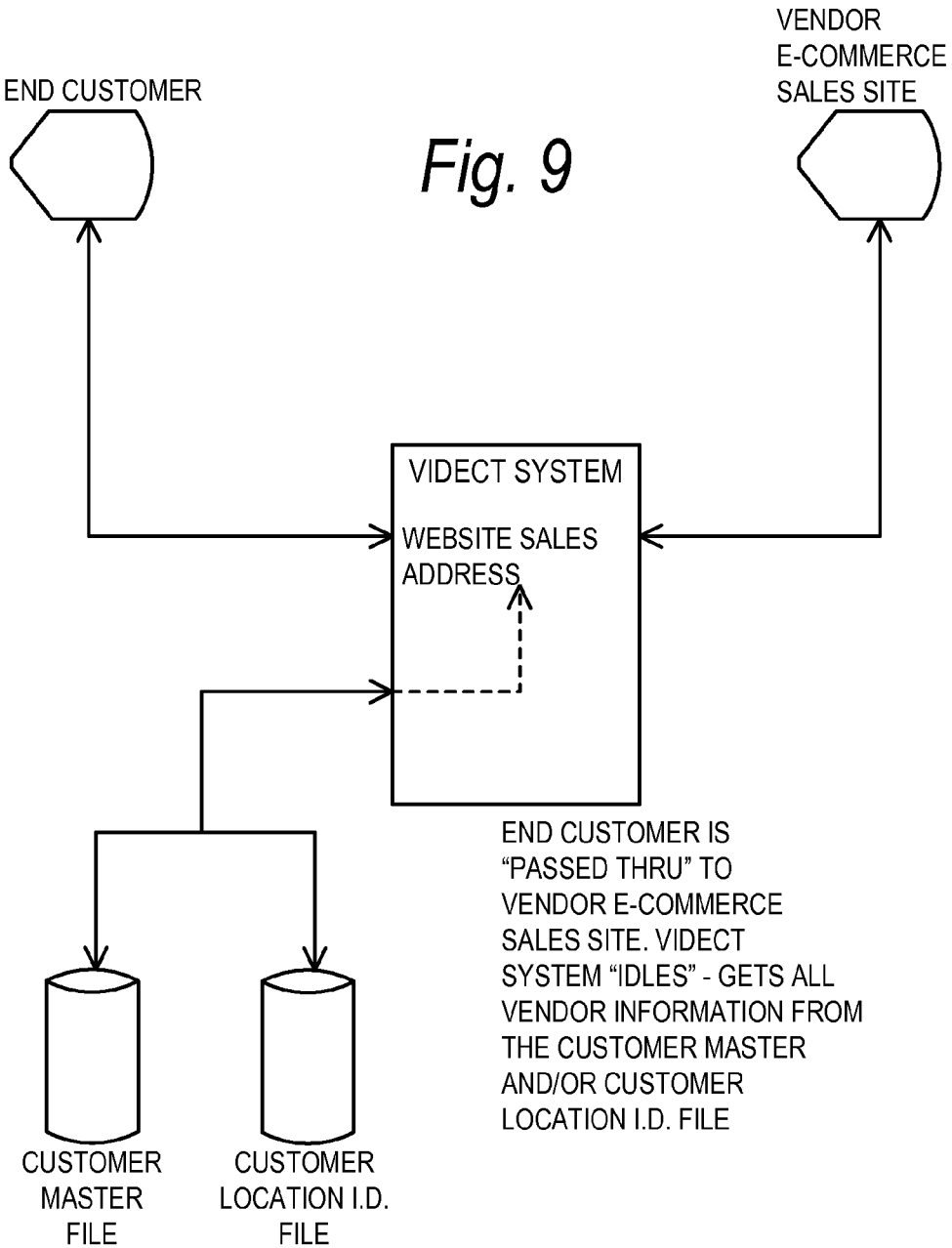

Upon selection of the website sales address, the end customer is "passed through" to the vendor's sales site as shown in FIG. 9. At this point, the VIDECT system enters an idle state (i.e., passing through communications between the end customer and the vendor site as the end customer makes purchase selections on the vendor site).

Figure 10:
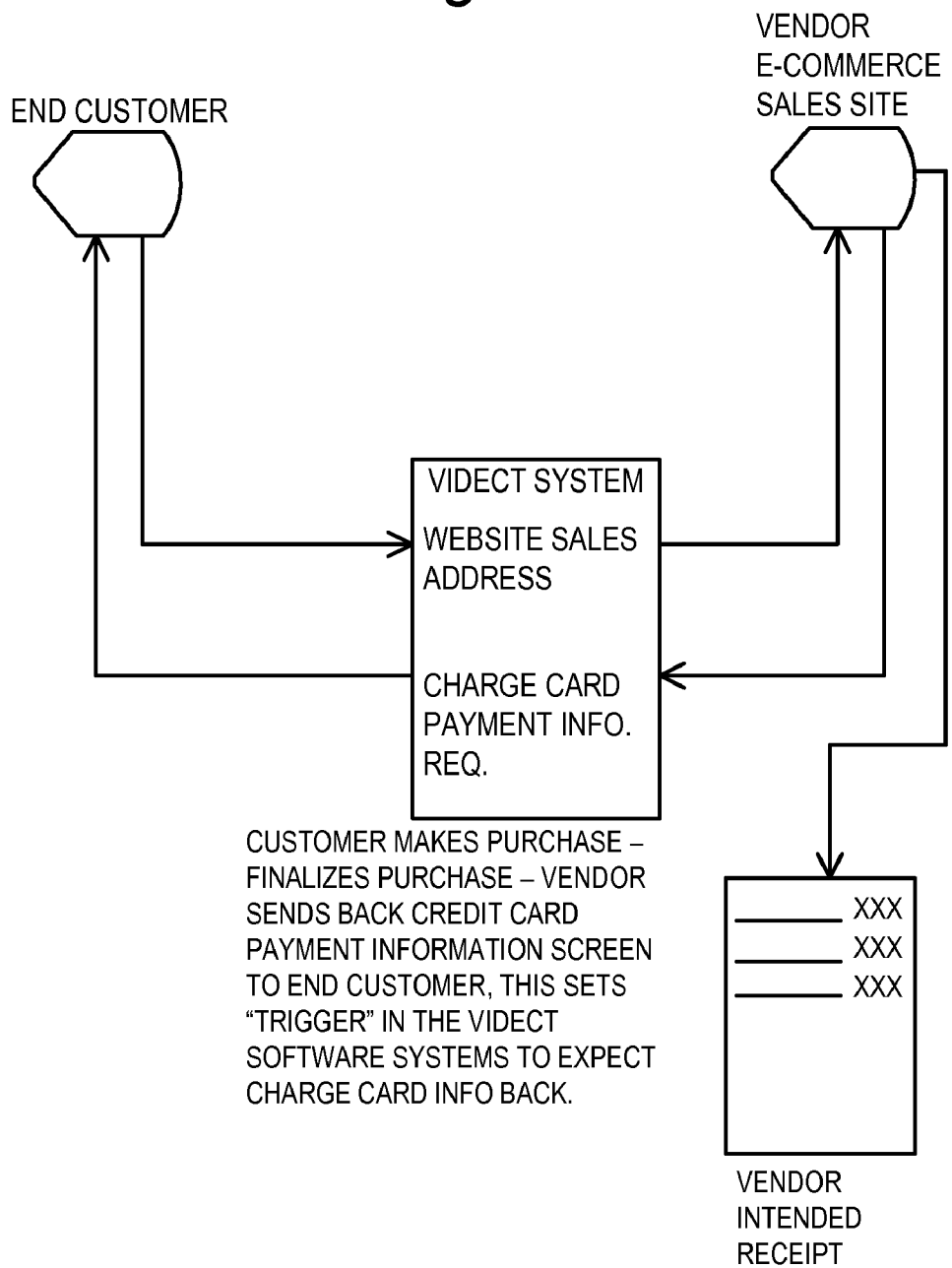

As shown in FIG. 10, the end customer makes purchases at the respective sales site, then ends the purchases. The sales vendor sends to the end customer the credit card payment information screen. This sets a "trigger" in the VIDECT software systems to expect the credit card information returned from the end customer.

Figure 11:
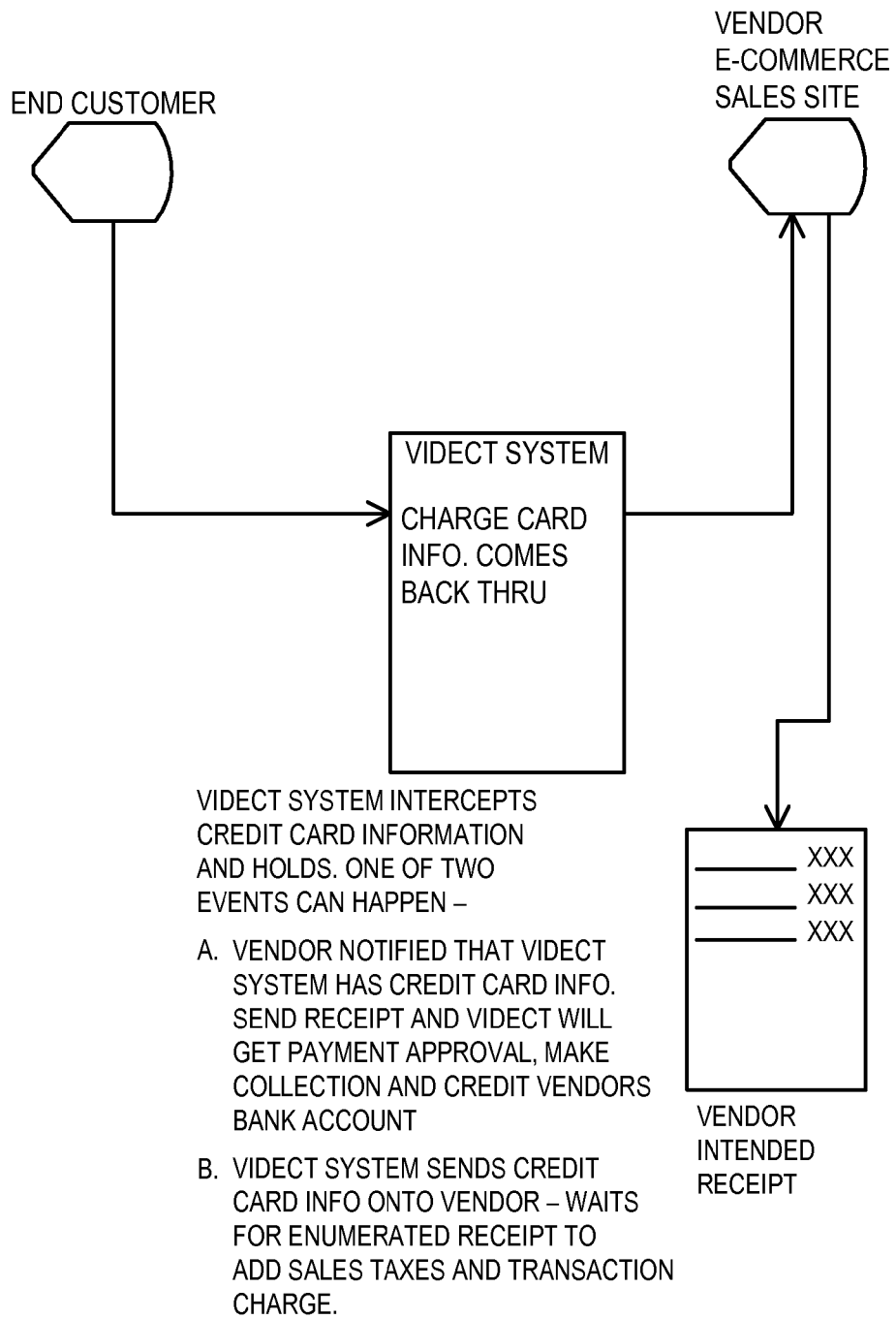

As shown in FIG. 11, the VIDECT software system "intercepts" the credit card information being returned from the end customer. This is the "point" at which the VIDECT software systems define one of two possible outcomes. These outcomes depend on how the operational definition of the VIDECT software systems is laid out. The reason is that the outcomes dictate whether or not the sales vendor will have to change its POS system. Also, the outcomes determine whether the sales vendor will be required to keep an account on the VIDECT software systems or at a bank that allows the transfer of tax monies collected by the VIDECT software systems for the tax that are due to the vendor on the sale in question. These monetary transfers will occur on a daily basis to allow the vendor's "cash flow" to continue at business operations. Outcome A is as follows. The sales vendor is notified that VIDECT software system has the credit card information from the end customer. The receipt is sent to cover the end customers purchases and the VIDECT software system will interface with the credit card company to approve the purchase. Outcome B is as follows. The VIDECT software system sends the credit card information to the vendor for approval. The system waits to see the receipt so that the appropriate sales taxes and transactional charge can be added.

Figure 12:
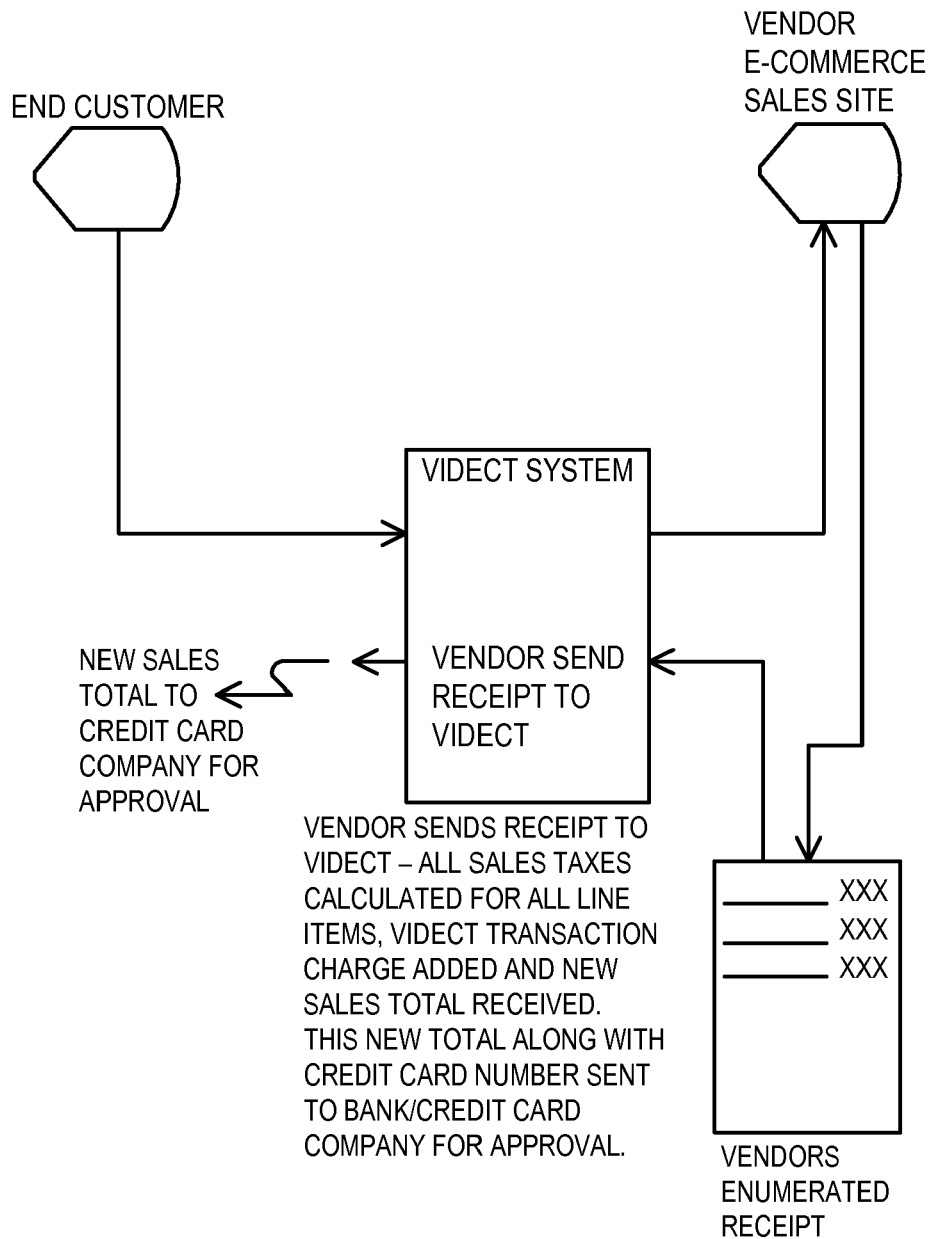

Outcome A is shown in greater detail in FIG. 12. The vendor sends the receipt for the end customer's purchase to the VIDECT software systems. Sales taxes for all sales tax jurisdictions for each line item of the purchase are calculated and the transactional charge is applied per line item. A new sales total is received. This new sales total is sent with the credit card number to the appropriate credit card issuer for purchase approval.

Figure 13:
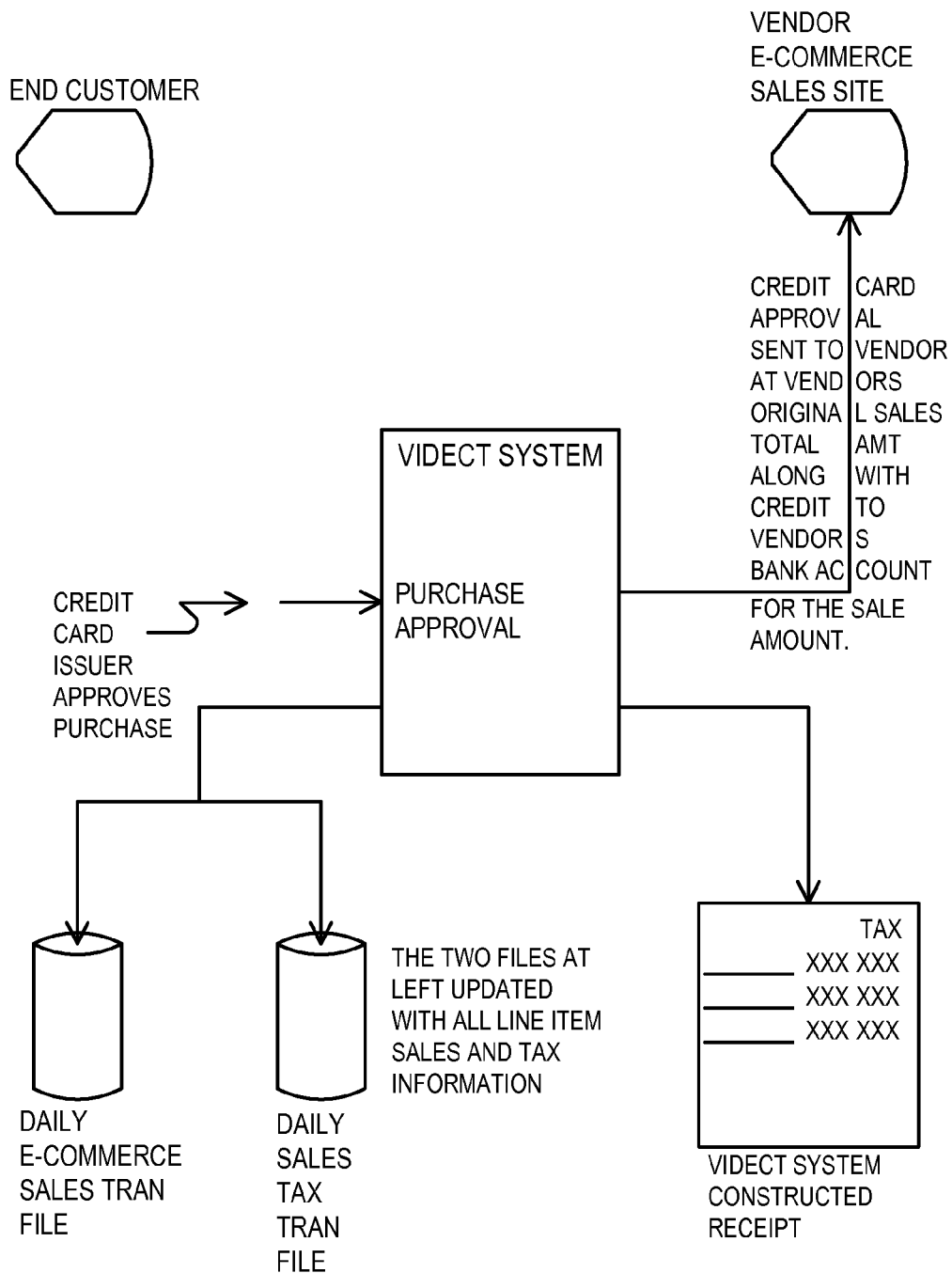

As shown in FIG. 13, the credit card issuer approves the purchase to the VIDECT software systems for the new sales total. The vendor is notified that the purchase(s) made by the customer for his/her sales total has been approved. At this point, the VIDECT software systems "transfers" to the vendors account his/her sales total approved by the credit card issuer. All line item records enumerating the purchase are written to the daily sales transaction file and to the daily sales tax file. VIDECT software systems prepare a receipt covering all line items of the end customer's purchase, including the calculated sales taxes for each line item.

Figure 14:
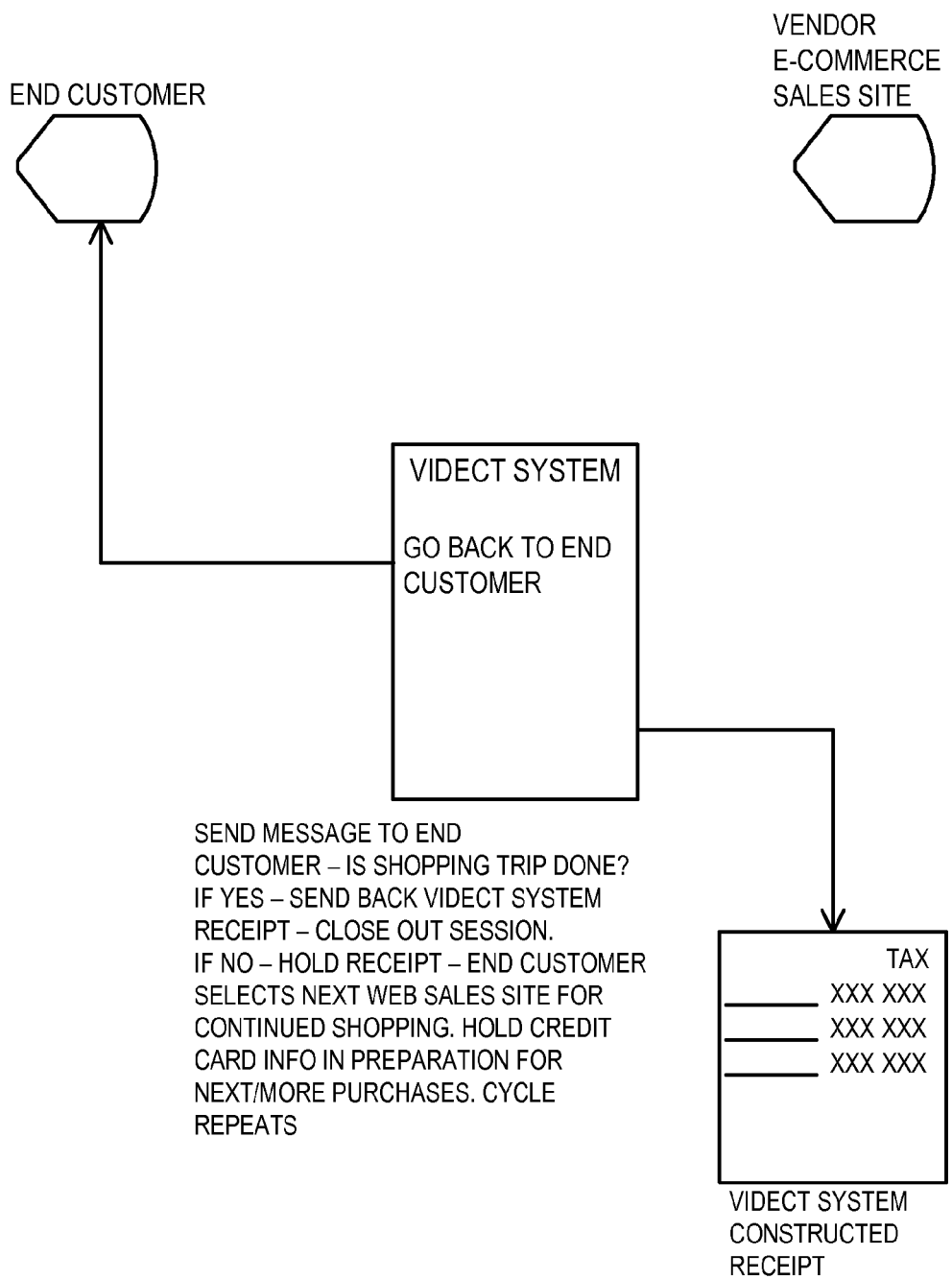

As shown in FIG. 14, the VIDECT software systems sends a message to the customer asking if the shopping trip is complete. If the customer responds with a "yes", then he/she is sent the enumerated receipt and the shopping trip is closed out. If "no", then the enumerated receipt and the credit card information are kept by the software systems. The customer selects the next website to shop and the process repeats itself. In the repeated process, it is NOT REQUIRED that the customer re-enter his/her credit card number again. The software systems already have the credit card number which can be used over and over again to be sent to the credit card issuer/bank for approval of every vendor total E-Commerce site shopping trip purchase. This process keeps repeating itself until the customer says that he has completed shopping, at which point, the entire enumerated receipt which includes all line item sales from all vendors along with the sales taxes applied for each line item and the transactional charge levied is sent to the customer.

Figure 15:
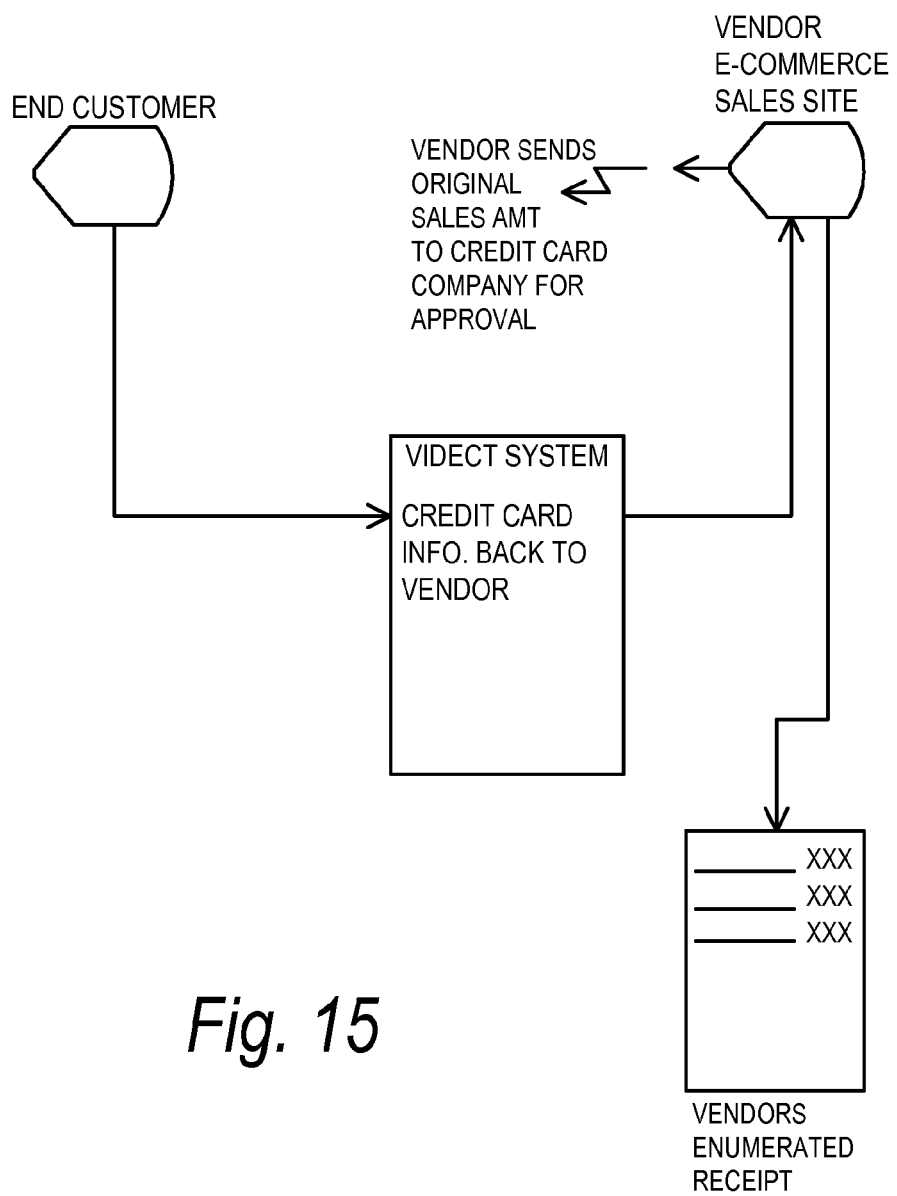

As shown in FIG. 15, the credit card information from the customer is "passed along" to the vendor so that he/she can receive approval for the sales total of the purchase. The credit card information from the customer is also kept by the VIDECT software systems for later usage.

Figure 16:
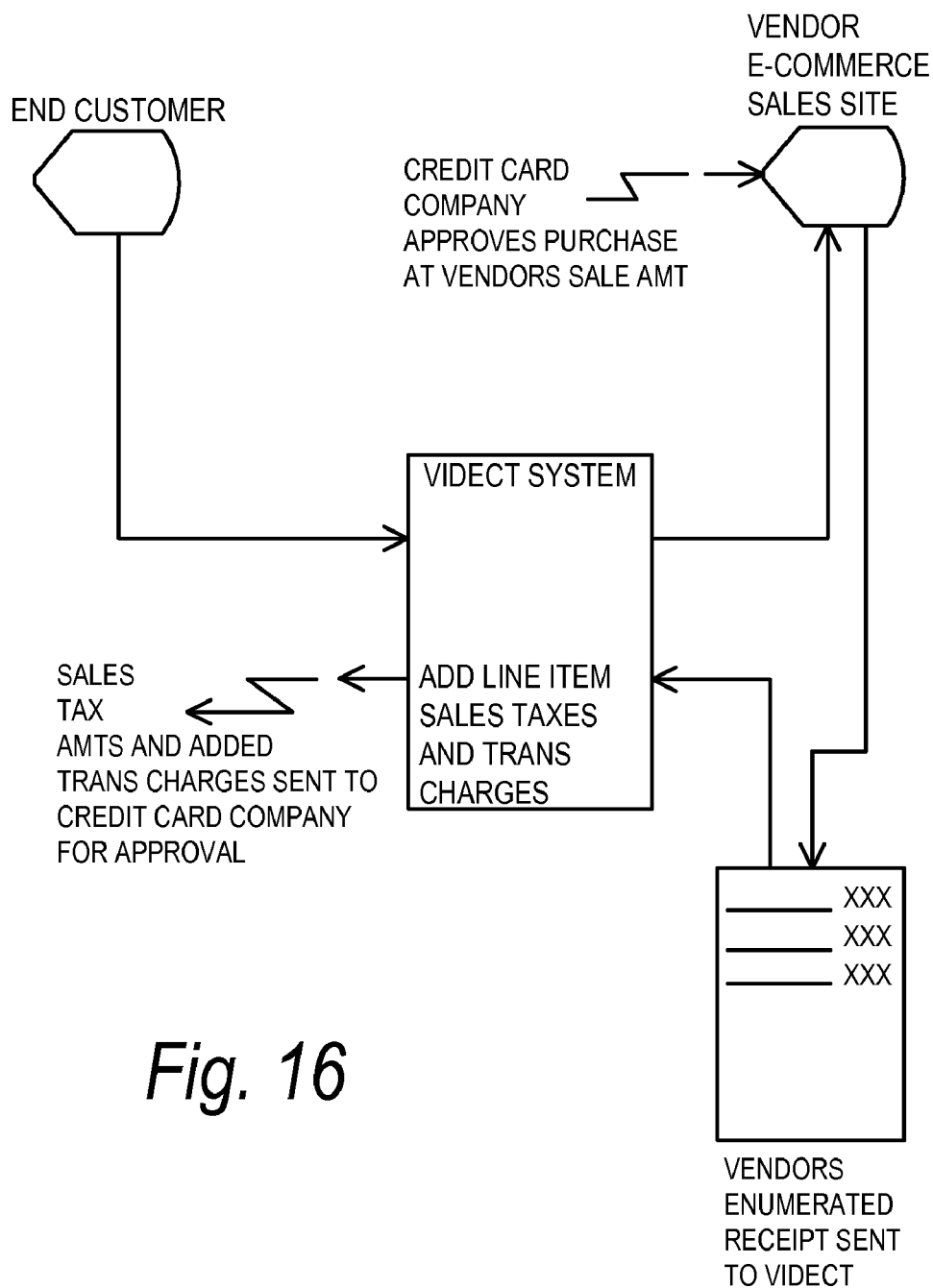

FIG. 16 shows that the credit card issuer approves the purchase to the vendor for the total sale. The vendor sends the enumerated receipt to the VIDECT software systems. The software system calculates all sales taxes for all sales tax jurisdictions for each line item of the purchase. In addition, the transaction charge is levied on a line item basis as well. The difference in the sales total amount (the VIDECT new sales total amount minus the vendors total amount) is sent to the credit card issuer for approval.

Figure 17:
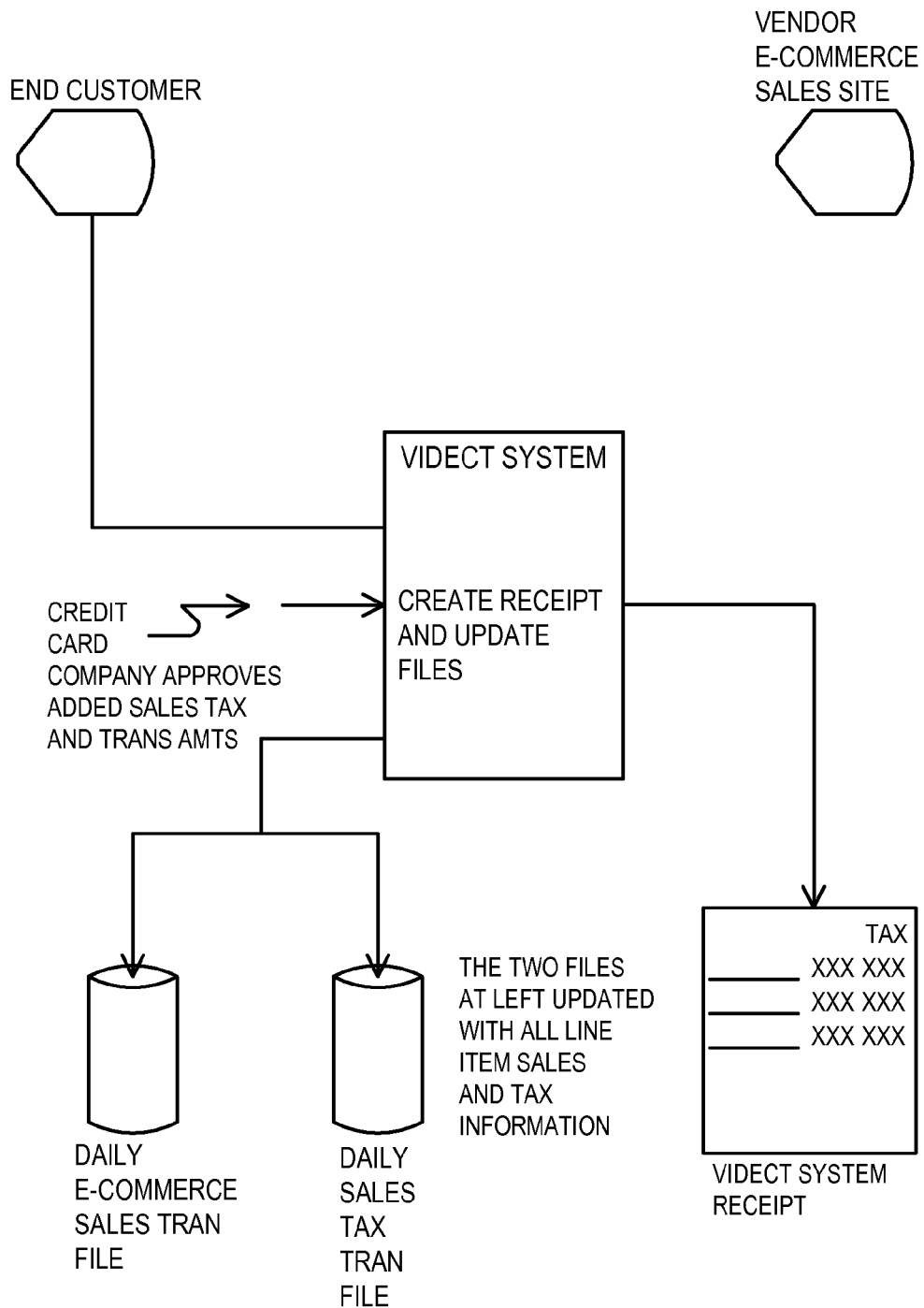

As shown in FIG. 17, the credit card issuer approves the difference in the sales total (sales tax+the transactional charge). Records are then written to the daily sales transactions file and the daily sales tax file for each and every line item purchased from the vendor.

Figure 18:
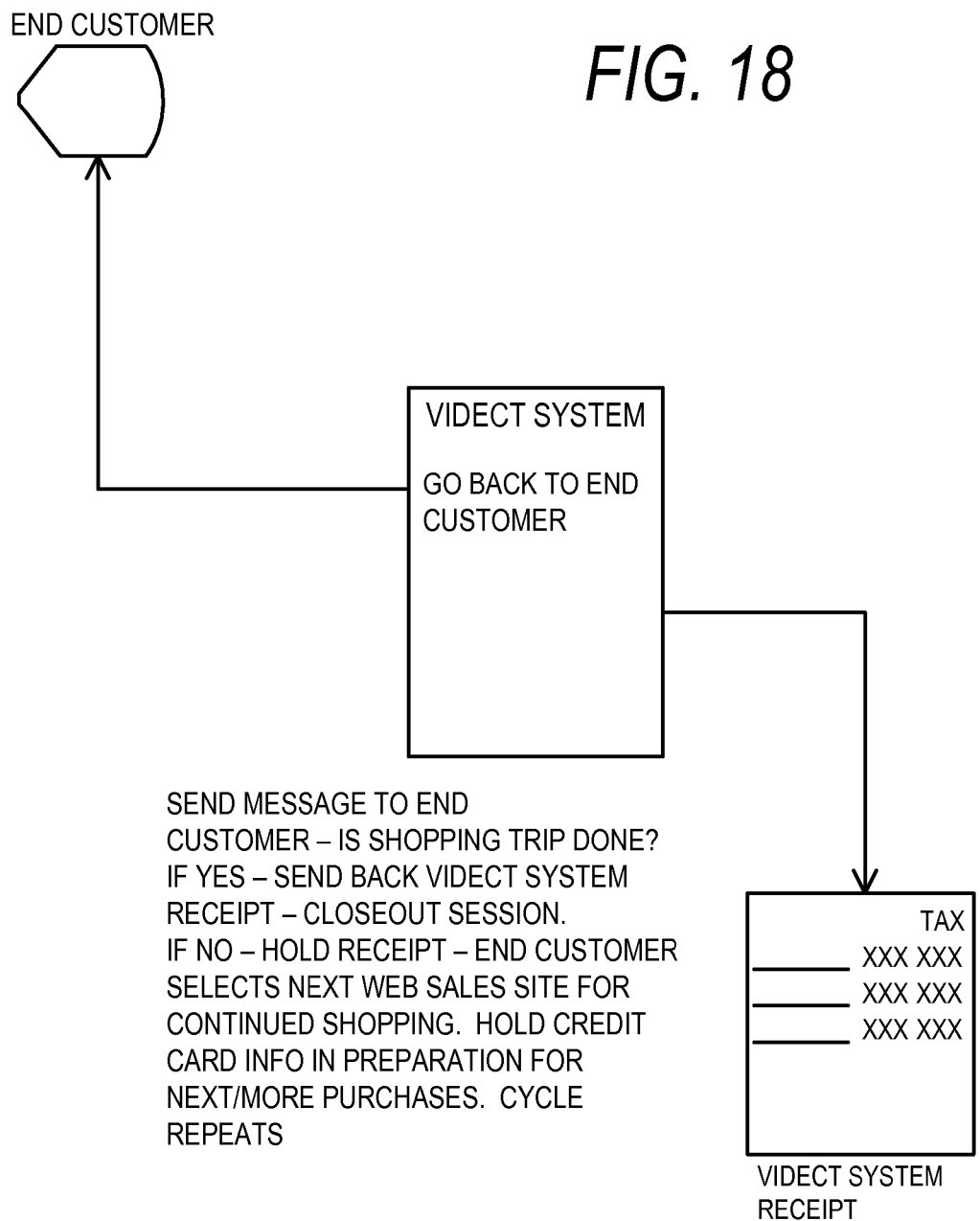

As shown in FIG. 18, an enumerated receipt is constructed by the VIDECT software systems for the customer. A message is sent to the customer asking if his/her shopping trip is complete. If "yes", the shopping trip session is closed out and the enumerated receipt is sent to the customer. If "no", the credit card information is kept along with the constructed sales receipt by the VIDECT software systems. The customer then selects the next shopping site and the cycle is repeated. The credit card number is kept and the VIDECT software system sends to the next vendor when their POS system requests it for purchase approval. The customer need not enter it anymore. This cycle is repeated until the customer says that he has completed his shopping trip. When this occurs, the enumerated receipt, which includes all line items purchased from all vendors, along with the calculated sales taxes covering all sales tax jurisdictions for each line item and the transactional charge for each, is sent to the customer.

As described above, the VIDECT software system controls the payment vehicle approach outlined in A and B. In Outcome A, the VIDECT software systems request the payment information, not the sales vendor. As such, it is the VIDECT software systems that receive approval from the credit card issuer/bank and collect the total amount of the sale from the credit card issuer/bank. This method requires the vendor to provide the VIDECT operator with bank account information as to where to deposit the collected amounts to overnight. The collected monies on behalf of the vendor would not be held back, as the vendor will no doubt need to facilitate their business operations on a daily basis.

The second method as outlined in Outcome B requires virtually no change to the vendors POS software systems and the methods used to collect the sales due amounts. The VIDECT software systems become, in essence, a sales tax collection mechanism and enumerated receipt mechanism only. The "universality" of the purchasing mechanism is somewhat muted although the universality of the sales tax collection mechanism remains. A preferred embodiment is a combination of the Outcomes A and B for the VIDECT software systems. The VIDECT system acts as the total collection agent for both the original sales amount, the added sales tax and the transactions charge amounts. In essence, this allows the VIDECT software systems to act as the controlling agent in any/all POS applications that E-Commerce vendors employ on the internet to carry out their sales/return functions. This "universality" of the VIDECT software systems allows for overall efficiencies of scale including significant cost reductions to occur for the customer, the vendor, and for the sales tax jurisdictions that levy/collect E-Commerce sales taxes.

What is claimed is:

1. A method for conducting an online shopping session between an end customer and a one or more vendors through a central host, comprising the steps of:
    (a) the end customer contacting the central host to initiate an online shopping session;
    (b) the end customer invoking at the central host an address of a vendor site;
    (c) the central host entering an idle state for passing through communications between the end customer and the vendor site as the end customer makes purchase selections on the vendor site;
    (d) the central host setting a trigger in response to a payment information screen being sent to the end customer by the vendor site;
    (e) while the trigger is set, the central host intercepting payment information returned by the end customer;
    (f) the central host holding the purchase selections already made and returning to steps (b)-(e) invoking another address for another vendor site;
    (g) the central host receiving an indication from the end customer that the online shopping session is completed;
    (h) the central host calculating appropriate sales taxes in response to the held purchase selections;
    (i) the central host obtaining payment authorization electronically according to the intercepted payment information to collect at least the sales taxes; and
    (j) the central host sending an enumerated receipt including all purchase selections from the online shopping session and the collected sales taxes, and then closing the online shopping session.

2. The method of claim 1 wherein in step (i), the central host obtains payment authorization to collect both the cost of the purchase selections for disbursement to respective vendors and the sales taxes for disbursement to respective tax authorities.

3. The method of claim 2 wherein disbursement of the cost of the purchase selections is substantially immediate.

4. The method of claim 2 wherein disbursement of the cost of the purchase selections occurs on a periodic basis.

5. The method of claim 2 wherein disbursement of the sales taxes is substantially immediate.

6. The method of claim 2 wherein disbursement of the sales taxes occurs on a periodic basis.

7. A system for conducting an online shopping session between an end customer and a vendor through a central host, the system comprising:
    the central host;
    at least one computer of an end customer; and
    at least one vendor server;
    wherein, the system is configured to perform the steps comprising:
    (a) the end customer contacting the central host to initiate an online shopping session;
    (b) the end customer invoking at the central host an address of a vendor site;
    (c) the central host entering an idle state for passing through communications between the end customer and the vendor site as the end customer makes purchase selections on the vendor site;
    (d) the central host setting a trigger in response to a payment information screen being sent to the end customer by the vendor site;
    (e) while the trigger is set, the central host intercepting payment information returned by the end customer;
    (f) the central host holding the purchase selections already made and returning to steps (b)-(e) invoking another address for another vendor site;
    (g) the central host receiving an indication from the end customer that the online shopping session is completed;
    (h) the central host calculating appropriate sales taxes in response to the held purchase selections;
    (i) the central host obtaining payment authorization electronically according to the intercepted payment information to collect at least the sales taxes; and
    (j) the central host sending an enumerated receipt including all purchase selections from the online shopping session and the collected sales taxes, and then closing the online shopping session.

8. The system of claim 7 wherein in step (i), the central host obtains payment authorization to collect both the cost of the purchase selections for disbursement to respective vendors and the sales taxes for disbursement to respective tax authorities.

9. A non-transitory computer-readable storage medium having computer-executable instructions stored thereon for conducting an online shopping session between an end customer and a vendor through a central host by performing the steps of:
    (a) the end customer contacting the central host to initiate an online shopping session;
    (b) the end customer invoking at the central host an address of a vendor site;
    (c) the central host entering an idle state for passing through communications between the end customer and the vendor site as the end customer makes purchase selections on the vendor site;
    (d) the central host setting a trigger in response to a payment information screen being sent to the end customer by the vendor site;
    (e) while the trigger is set, the central host intercepting payment information of returned by the end customer;
    (f) the central host holding the purchase selections already made and returning to steps (b)-(e) invoking another address for another vendor site;
    (g) the central host receiving an indication from the end customer that the online shopping session is completed;
    (h) the central host calculating appropriate sales taxes in response to the held purchase selections;
    (i) the central host obtaining payment authorization electronically according to the intercepted payment information to collect at least the sales taxes; and
    (j) the central host sending an enumerated receipt including all purchase selections from the online shopping session and the collected sales taxes, and then closing the online shopping session.

10. The non-transitory computer-readable storage medium of claim 9 wherein in step (i), the central host obtaining payment authorization to collect both the cost of the purchase selections for disbursement to respective vendors and the sales taxes for disbursement to respective tax authorities.

* * * * *